United States Patent [19]

Miyake et al.

[11] Patent Number: 5,157,315
[45] Date of Patent: Oct. 20, 1992

[54] METHOD OF CONTROLLING ROBOT MOVEMENTS

[75] Inventors: Norihisa Miyake, Matsudo; Masaki Sumita, Yachiyo; Koichi Sugimoto, Hiratsuka, all of Japan

[73] Assignees: Hitachi, Ltd., Tokyo; Hitachi Keiyo Engineering Co., Ltd., Chiba, both of Japan

[21] Appl. No.: 535,140

[22] Filed: Jun. 8, 1990

[30] Foreign Application Priority Data

Jun. 9, 1989 [JP]  Japan .................................. 1-147468

[51] Int. Cl.⁵ .......................................... G05B 19/18
[52] U.S. Cl. .................... 318/568.11; 318/568.19; 318/568.22; 395/87; 395/97
[58] Field of Search ................. 318/560–632; 364/513, 474.11, 167.01; 901/3–23; 395/80–99

[56] References Cited

U.S. PATENT DOCUMENTS

| | | | |
|---|---|---|---|
| 3,748,563 | 7/1973 | Pomella et al. | 318/571 X |
| 4,680,519 | 7/1987 | Chand et al. | 364/167.01 X |
| 4,698,572 | 10/1987 | Stone | 364/513 |
| 4,703,443 | 10/1987 | Moriyasu | 364/167.01 X |
| 4,706,204 | 11/1987 | Hattori | 364/513 |
| 4,771,222 | 9/1988 | Nakashima et al. | 318/568.1 X |
| 4,815,006 | 3/1989 | Andersson et al. | 901/3 X |
| 4,823,279 | 4/1989 | Perzley et al. | 364/191 X |
| 4,831,547 | 5/1989 | Ishiguro et al. | 364/191 X |
| 4,831,549 | 5/1989 | Red et al. | 901/16 X |
| 4,836,742 | 6/1989 | Ishiguro et al. | 901/4 X |
| 4,858,140 | 8/1989 | Buhler et al. | 318/573 X |
| 4,868,473 | 9/1989 | Kato | 318/568.23 |
| 4,894,788 | 1/1990 | Stelzer | 318/568.19 X |
| 4,899,095 | 2/1990 | Kishi et al. | 318/568.19 X |
| 4,903,213 | 2/1990 | Buhler et al. | 318/573 X |

*Primary Examiner*—Paul Ip
*Attorney, Agent, or Firm*—Antonelli, Terry, Stout & Kraus

[57] ABSTRACT

A method of controlling the movements of a robot having a plurality of degrees of freedom includes expressing the attitudes of a hand or a working tool fitted to the arm end of the robot, the by the use of base vectors of a rectangular coordinate system fixed to the hand or the working tool. The attitudes are given as coordinate components related to a rectangular coordinate system which is fixed to the pedestal of the robot and which serves as reference. Interpolation and movement control of the robot is performed on the basis of the coordinate components. By performing control, based on the coordinate components real-time calculation processings is reduced highly accurate robot movement which is smooth in terms of both time and space is accomplished.

3 Claims, 4 Drawing Sheets

FIG. 1
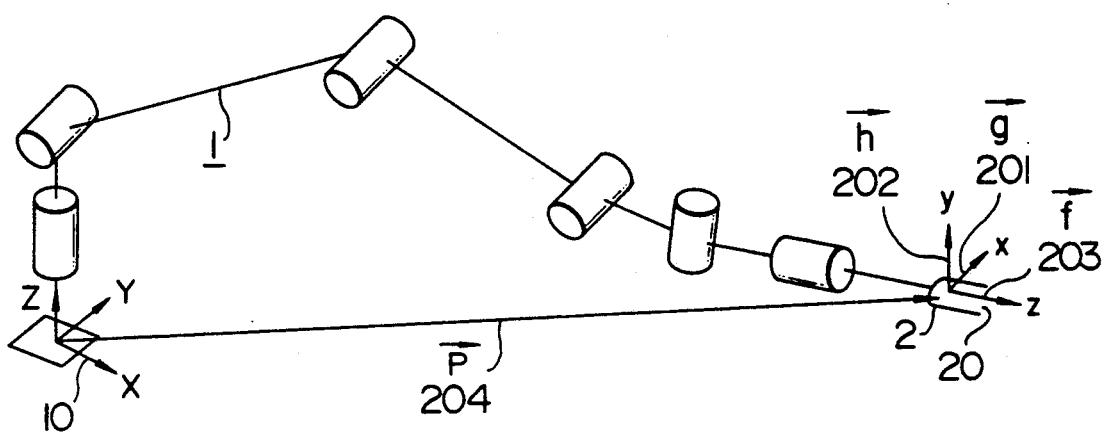
FIG. 2
FIG. 3
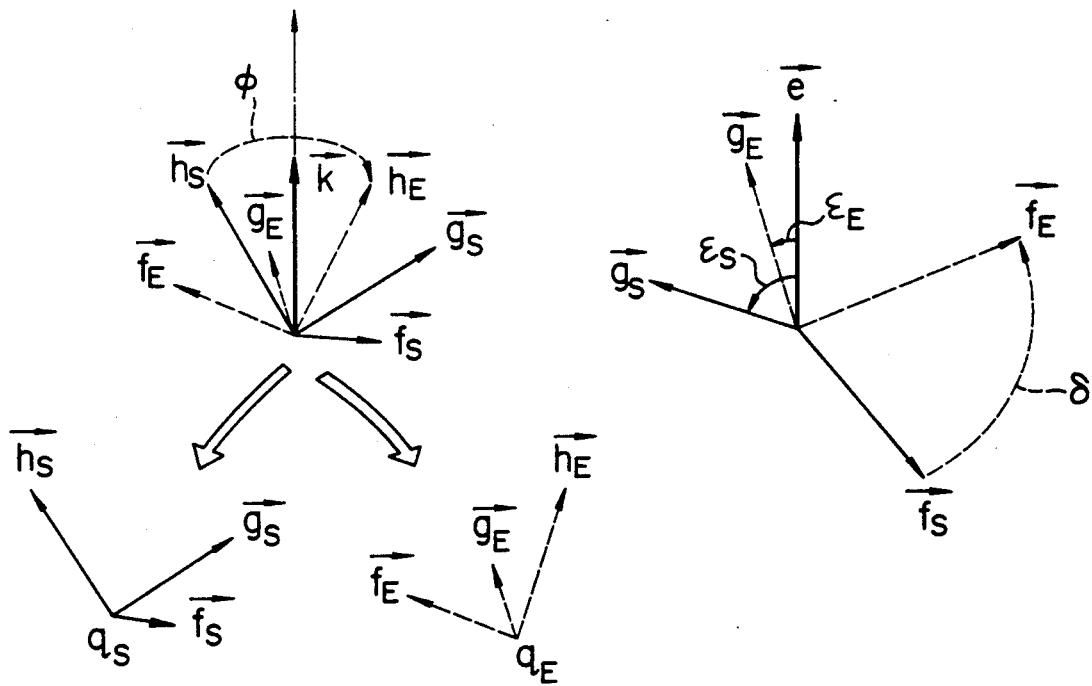

METHOD OF CONTROLLING ROBOT MOVEMENTS

BACKGROUND OF THE INVENTION

This invention relates to a method of controlling the movements of a robot and, in particular, to a method suited for controlling the attitudes of a working tool held by the robot in a three-dimensional space.

Various methods of controlling robot movements have been invented in the past. Japanese Patent Examined Publication No. 61-2964 discloses a method according to which the hand's positions and attitudes of the robot are controlled in such a manner that the hand follows a desired path in a three-dimensional space. When performing an operation using a robot, it is desirable that the robot movements be controlled in accordance with the respective hand's positions and attitudes of the robot in the three-dimensional space, without depending on the arrangement of the degrees of freedom of the robot. In such a control process, interpolation is effected on the hand's positions and attitudes of the robot, which are given separately by teaching, and displacements at the different degrees of freedom of the robot satisfying the derived position and attitude are obtained, thereby effecting drive control. Alternatively, drive control is effected by obtaining speeds or torques (or forces) at the different degrees of freedom of the robot corresponding to the position and attitude derived by interpolation.

According to the method disclosed in the above-mentioned Japanese Patent Examined Publication No. 61-2964, a rectangular coordinate system is set up which is fixed with respect to the robot installation position and interpolation is effected between the positions and attitudes of two given points using positions related to this coordinate system and angles set on the basis thereof. By individually effecting linear interpolation of each of the parameters representing these positions and angles, the interpolation between the positions and attitudes of the two given points is achieved, obtaining the displacements of the robot at the respective degrees of freedom corresponding to the derived position and angle, thus effecting drive control. As disclosed in the above-mentioned patent publication and Japanese Patent Publication No. 60-51121, the teaching data for effecting this sort of control is stored as position coordinate values and angle coordinate values which are related to a rectangular coordinate system in correspondence with the control system described above.

In the above-described conventional technique, the robot attitude is represented as angle coordinate values related to a rectangular coordinate system and the values between the angle coordinate values corresponding to two given attitudes are obtained as intermediate angle coordinate values which are derived by individually interpolating each component, robot control being effected on the basis of these values. Methods of the type in which the attitude is expressed thus using angle coordinate values include the one using Euler's angles, which is shown in "Robot Manipulators" (by Paul, MIT Press), and the one using roll, pitch and yaw angles. The problem with these methods is that the angle coordinates values are indefinite for particular attitudes, resulting in conditions which do not allow such mode of expression to be adopted. In the case where Euler's angles are used, for example, the angle coordinates of the main axis N determining the attitude is given by a first angle $\alpha$ determined in the xy plane and a second angle $\beta$ determined in a plane perpendicular to the xy plane, as shown in FIG. 8. If the main axis N coincides with the Z-axis, the angle coordinate $\alpha$ can exist infinitely. This position is referred to as a singular point dependent upon the manner of expression. In this state, the attitude path of interpolation cannot be determined definitely.

The calculation with which the hand's position and attitude of the robot are obtained from the displacements at the respective degrees of freedom of the robot is called normal coordinate transformation. The transformation between the coordinate systems set before and after each degree of freedom is expressed in the form of a matrix. In this regard, generally used are methods in which the position and attitude on the basis of displacements at multiple degrees of freedom is obtained as the product of this transformation or else methods using vectors. Here, the attitude of the hand is obtained in the form of a direction cosine of base vectors of a coordinate system fixed to the hand with respect to a coordinates system fixed to the robot pedestal. For this to be transformed to an expression using angle coordinates such as Euler's angles, it has been conventionally necessary to perform a transformational calculation using an inverse trigonometral function, etc. The "Robot Manipulators" by Paul, mentioned above, gives in detail concrete examples of the above-described normal coordinate transformation and of the transformation between the direction cosine and Euler's angles.

On the other hand, the calculation for obtaining displacements at the respective degrees of freedom from the hand's position and attitude of the robot is called inverse coordinate transformation. As is apparent from the above, the displacements at the respective degrees of freedom of the robot have generally been obtained from angle coordinate values such as Euler's angles by first transforming the angle coordinate values into an expression using a direction cosine or the like and further transforming this into the displacements at the respective degrees of freedom. As a concrete example of this method, Japanese Patent Publication No. 61-2964, mentioned above, discloses a control method for a robot having five degrees of freedom, according to which calculation is repeated using the Newton-Raphson method. In correspondence with this method, Japanese Patent Publication No. 60-51121 discloses a method according to which position coordinate values and angle coordinate values with respect to a rectangular coordinate system are stored as information on points in the path of a robot movement. In this example, roll, pitch and yaw angles are used for representing angle coordinate values.

Next, to be described will be the attitude interpolation method. According to a method generally used, interpolation is effected through linear proportional distribution of the components of Euler's angles or roll, pitch, yaw angles at the initial and terminal interpolation ends. This method is also shown in the above-mentioned Japanese patent Publication No. 60-2964. In the case where such an interpolation method is adopted, the path, i.e., the way the robot hand or the working tool moves, varies apparently during interpolation depending on how the angle coordinate values are defined. For example, there exists a difference between the case where Euler's angles are used and the case where roll, pitch and yaw angles are used. Furthermore, the attitude interpolation path still differs among cases where Euler's angles are used, depending on the manner of defining the rectangular coordinate system which serves as the reference for its expression. This is due to the fact that the attitude interpolation is performed by directing attention exclusively to those angle coordinate values which are expressed in terms of a particular rectangular coordinate system; in an angle coordinate system giving a three-dimensional rotation amount, no such addition theorem as is available in the case of position coordinate values holds good. Thus, in conventional methods, the attitude interpolation path depends on the manner of expression itself. Consequently, the robot movement is not necessarily easy to predict for the person teaching the path, with the result that the robot can make unexpected movements.

SUMMARY OF THE INVENTION

It is accordingly a first object of this invention to provide a method of expressing the hand position and attitude of a robot and a data storage system for teaching which help to facilitate the transformation calculation between displacements at the respective degrees of freedom of the robot and the three-dimensional expression of the position of the arms end and attitude of the robot, thus reducing the calculation processings involved. A second object of this invention is to provide, as an application of this expression method, an attitude interpolation method which makes it possible to realize a robot movement that is easy to predict for the person performing teaching.

In accordance with this invention, the above first object can be achieved by a method of controlling the movements of a robot having a plurality of degrees of freedom, in which method the expression of attitudes of a robot hand or a working tool fitted to the arm end of the robot is effected such that base vectors of a rectangular coordinate system fixed to the hand or the working tool are stored as X-, Y-, Z-coordinate components relating to a rectangular coordinate system fixed to the robot pedestal and serving as reference.

The second object can be achieved by a method of controlling robot movements of the type in which teaching is performed on at least two attitudes of a hand or a working tool fitted to the arm end of a robot having a plurality of degrees of freedom, the robot being operated by effecting interpolation between them. The method includes the steps of: expressing attitudes of the hand or the working tool such that base vectors of rectangular coordinate systems fixed to the hand or the working tool are given as X-, Y-, Z-coordinate components relating to a rectangular coordinate system fixed to a robot pedestal and serving as reference, obtaining mutual transformation at initial and terminal interpolation ends as homogeneous transformation from base vectors of the rectangular coordinate system fixed to the hand or the working tool, obtaining a rotation axis and a rotation angle giving a rotational transformation around a single axis which is equivalent to the above-mentioned transformation, and determining the attitude interpolation path for the hand or the working tool by means of vectors obtained by rotating the above-mentioned base vectors around the rotation axis while interpolating the above-mentioned rotation angle.

Further, the second object can also be achieved by a method of controlling robot movements of the type in which teaching is performed on at least two attitudes of a hand or a working tool fitted to the arm end of a robot having a plurality of degrees of freedom, the robot being operated by effecting interpolation between them. The method includes the steps of: expressing attitudes of the hand or the working tool such that base vectors of a rectangular coordinate system fixed to the hand or the working tool are given as X-, Y-, Z-coordinate components relating to a rectangular coordinate system fixed to the robot pedestal and serving as reference, obtaining a rotation-axis vector commonly perpendicular to first ones of the above-mentioned base vectors at initial and terminal interpolation ends, obtaining a first rotation angle which constitutes the angle defined by the above-mentioned first base vectors at the initial and terminal interpolation ends, obtaining a second rotation angle which constitutes the difference between the angles defined by second ones of the above-mentioned base vectors at the above-mentioned initial and terminal interpolation ends and the above-mentioned rotation-axis vector, and determining the attitude interpolation path for the hand or the working tool by means of a first interpolation-result base vector obtained by rotating the above-mentioned first base vectors around the above-mentioned rotation-axis vector while interpolating the above-mentioned first and second rotation angles as well as by means of a second interpolation-result base vector obtained by rotating the above-mentioned second base vectors around the above-mentioned first interpolation-result base vector.

BRIEF DESCRIPTION OF THE DRAWINGS

FIG. 1 is a concept drawing of a coordinate system for expressing attitudes by means of vector components in accordance with this invention;

FIG. 2 illustrates an example of the attitude interpolation method in accordance with this invention;

FIG. 3 illustrates another example of the attitude interpolation method in accordance with this invention;

DETAILED DESCRIPTION OF THE PREFERRED EMBODIMENTS

Figure 4:
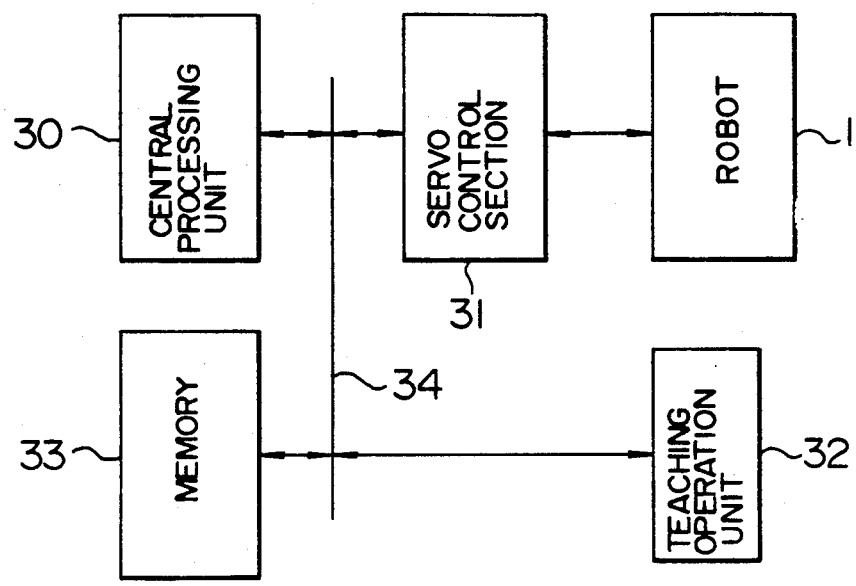
FIG. 4 is a block diagram showing an example of the configuration of a robot control apparatus.

An embodiment of this invention will now be described with reference to FIGS. 1 to 7.

As an example of the robots to which this invention is to be applied, FIG. 1 shows an articulated robot 1 having 6 degrees of freedom. Fixed to the pedestal of the robot 1 is a robot base coordinate system (hereinafter referred to as "base coordinate system") 10 which is a rectangular coordinate system. The robot 1 has a hand 2. Fixed to this hand 2 is a hand coordinate system 20, which is likewise a rectangular coordinate system. The three main axes of the base coordinate system 10 will be referred to as X-, Y- and Z-axes, and the three main axes of the hand coordinate system 20 will be referred to as x-, y- and z-axes. Suppose the main axis 21 of the hand 2 is selected to be set in the z-axis direction. Further, suppose the respective unit vectors 201, 202 and 203 in the x-, y- and z-axis directions are to be referred to as $\vec{g}$, $\vec{h}$ and $\vec{f}$, respectively. Further, the vector directed from the origin of the base coordinate system 10 toward the origin of the hand coordinate system 20, i.e., the position vector 204 of the hand 2, will be referred to as $\vec{p}$.

Here, attention will be directed to one particular degree of freedom, setting coordinate systems before and after this. The transformation between them is expressed as a homogeneous transformation matrix of 4 rows and 4 columns. A well-known example of such a method is the Denavit-Hartenberg notation shown in Vol. 77, pages 215 to 221 of ASME Journal of Applied Mechanics, 1955. By using such a method of expression, the transformation from the base coordinate system 10 to the hand coordinate system 20, of the robot 1, can be obtained as the product of the matrices representing the displacements at the respective degrees of freedom. The result can be expressed as the following equation:

$$\begin{bmatrix} nx & ox & ax & px \\ nY & oY & aY & pY \\ nX & oX & aX & pX \\ 0 & 0 & 0 & 1 \end{bmatrix} \quad (1)$$

The first column of this matrix corresponds to the direction cosine of the unit vector in the x-axis of the hand coordinate system 20 with respect to the base coordinate system 10. The second and third columns are respectively related to the unit vectors in the y-axis and z-axis of the hand coordinate system (hereinafter referred to as base vectors). The fourth column is an expression of the origin of the hand coordinate system 20 in the base coordinate system 10. Thus, the components of the vector 201 can be shown as:

$$\vec{g} = (nx, ny, nz)^t \quad (2)$$

Those of the vector 202 can be shown as:

$$\vec{h} = (ox, oy, oz)^t \quad (3)$$

and those of the vector 203 can be shown as:

$$\vec{f} = (ax, ay, az)^t \quad (4)$$

where t represents transposition. Obviously, $$\vec{p} = (px, py, pz)^t \quad (5)$$

As will be appreciated from the above, by expressing hand attitudes by means of the base vectors 201, 202 and 203 of the hand coordinate system 20, which is fixed with respect to the hand 2, positions and attitudes of the robot can be easily expressed solely by obtaining transformation matrices from the displacements of the robot 1 at the respective degrees of freedom and calculating the product thereof.

As an example of the methods using angle coordinate values, a case will be considered where Euler's angles $\alpha, \beta, \gamma$ are used. As also shown in the above-mentioned "robot Manipulators" by Paul, the following equations (6), (7) and (8) hold good:

$$\alpha = \tan^{-1} \frac{-ay}{-ax} \quad (6)$$

$$\beta = \tan^{-1} \frac{\cos\alpha \cdot ax + \sin\alpha \cdot ay}{az} \quad (7)$$

$$\gamma = \tan^{-1} \frac{-\sin\alpha \cdot nx + \cos\alpha \cdot ny}{-\sin\alpha \cdot ox + \cos\alpha \cdot oy} \quad (8)$$

Accordingly, the values of $\alpha, \beta, \gamma$ must be calculated on the basis of these equations. Thus, the method in which attitudes of the hand 2 are expressed using the vectors $\vec{f}, \vec{g}$, and $\vec{h}$ is advantageous in that it involves less calculation processings for normal coordinate transformation than methods using angle coordinate values such as Euler's angles.

Next, inverse coordinate transformation, through which displacements $\theta_1$ to $\theta_6$ at the respective degrees of freedom of the robot 1 are obtained from the position and attitude of the hand 2, will be considered with reference to the so-called elbow manipulator shown in FIG. 1. As also shown in the above-mentioned writing by Paul, the following equation hold good:

$$\theta_s = \tan^{-1} \frac{C_{234}(C_1 ax + S_1 ay) + S_{234} az}{S_2 ax - C_1 ay} \quad (9)$$

where $C_1 = \cos\theta_1, S_1 = \sin\theta_2$ $C_{234} = \cos(\theta_2 + \theta_3 + \theta_4)$ $S_{234} = \sin(\theta_2 + \theta_3 + \theta_4)$ If the attitude of the hand 2 is expressed using the vectors $\vec{f}, \vec{g}$ and $\vec{h}$, inverse coordinate transformation can be effected solely by applying these equations, whereas, methods using angle coordinates involve more calculation processings. Taking the method using Euler's angles $\alpha, \beta, \gamma$ as an example, it is necessary to apply, for instance, the following equations:

$$nx = \cos\alpha \cdot \cos\beta \cdot \cos\gamma - \sin\alpha \cdot \sin\beta \quad (10)$$

$$ny = \sin\alpha \cdot \cos\beta \cdot \cos\gamma + \cos\alpha \cdot \sin\beta \quad (11)$$

$$nz = -\sin\beta \cdot \cos\gamma \quad (12)$$

$$ax = \cos\alpha \cdot \sin\beta \quad (13)$$

$$ay = \sin\alpha \cdot \sin\beta \quad (14)$$

$$az = \cos\beta \quad (15),$$

which constitute inverse functions to the above equations (6) to (8), in order to obtain nx, ny, nz, ax, ay, az, etc. which correspond to the vectors $\vec{f}, \vec{g}$ and $\vec{h}$. Accordingly, by using vectors as the means of expressing attitudes, the calculation processings for inverse coordinate transformation can be reduced by the transformation calculations corresponding to the above equations (10) to (15), thus reducing the time for calculation process.

From the relationship between the base vectors of the rectangular coordinate systems, the following equation holds good:

$$\vec{f} \times \vec{g} = \vec{h} \quad (16)$$

(where "x" represents the outer product of the vectors), and, for the attitude of the hand 2 to be expressed in the form of vectors, it is sufficient to determine only two of the three base vectors of the hand coordinate system 20. Suppose the attitude is expressed using only the vectors $\vec{f}$ and $\vec{g}$. If it becomes necessary to use the vector h for coordinate transformation, etc., the calculation of the equation (16) can be performed. The calculation processings involved are less than those for the equations (10) to (15). Moreover, the equations (10) to (15) only relates to $\vec{g}=(nx, ny, nz)^t$ and $\vec{f}=(ax, ay, az)^t$. When one comes to think of the fact that the equation relating to $\vec{h}=(ox, oy, oz)^t$ has to be obtained either in the same manner as when using the equations (10) to (15) or from the equation (16), it will be apparent which method is more advantageous in terms of the amount of calculation processings.

Thus, the attitude data for the robot hand or the working tool is stored such that base vectors of the rectangular coordinate system fixed to the hand or the working tool are given as components relating to the rectangular coordinate system X, Y, Z fixed to the robot pedestal and serving as reference, so that the displacements of the robot at the respective degrees of freedom can be obtained from the stored attitude data directly through inverse coordinate transformation process on the basis of the equations previously obtained.

So far methods of expressing attitudes and positions of the hand 2 of the robot 1 have been discussed. Next, the method of attitude interpolation for the hand 2 will be described.

The position and attitude of the hand 2 at the initial interpolation end are to be expressed as:

$$P_S = \begin{bmatrix} n_{xs} & o_{xs} & a_{xs} & p_{xs} \\ n_{ys} & o_{ys} & a_{ys} & p_{ys} \\ n_{zs} & o_{zs} & a_{zs} & p_{zs} \\ 0 & 0 & 0 & 1 \end{bmatrix} \quad (17)$$

and the position and attitude of the hand at the terminal interpolation end are to be expressed as:

$$P_E = \begin{bmatrix} n_{xE} & o_{xE} & a_{xE} & p_{xE} \\ n_{yE} & o_{yE} & a_{yE} & p_{yE} \\ n_{zE} & o_{zE} & a_{zE} & p_{zE} \\ 0 & 0 & 0 & 1 \end{bmatrix} \quad (18)$$

$P_{xs}$, $P_{ys}$, $P_{zs}$ represent the coordinates of the hand 2 at the interpolation starting point with respect to the base coordinate system and $P_{xE}$, $P_{yE}$, $P_{zE}$ represent the coordinates of the hand 2 at the interpolation terminating point with respect to the base coordinate system. The positional interpolation can be performed by a well-known method such as linear interpolation and circular interpolation, so that it will not be discussed here. Here, exclusively considered will be smaller matrices obtained by removing the respective fourth rows and columns from the above $P_S$ and $P_E$. Thus, as shown in FIG. 2, only the following matrices will be considered:

$$q_S = \begin{bmatrix} n_{xs} & o_{xs} & a_{xs} \\ n_{ys} & o_{ys} & a_{ys} \\ n_{zs} & o_{zs} & a_{zs} \end{bmatrix} \quad (19)$$

$$q_E = \begin{bmatrix} n_{xE} & o_{xE} & a_{xE} \\ n_{yE} & o_{yE} & a_{yE} \\ n_{zE} & o_{zE} & a_{zE} \end{bmatrix} \quad (20)$$

Supposing that transformation T is effected on the attitude $q_S$ at the starting point and its result is $q_E$, $$q_E = T q_S \quad (21)$$

Accordingly, $$T = q_E q_S^{-1} = q_E q_S^T \quad (22)$$

where $q^{-1}$ is the inverse matrix to q.

Since det $(q) = 1$, it is obvious that $q^{-1} = q^t$. Assuming that the T obtained from the equation (22) is to be expressed as:

$$T = \begin{bmatrix} t_{11}, & t_{12}, & t_{13} \\ t_{21}, & t_{22}, & t_{23} \\ t_{31}, & t_{32}, & t_{33} \end{bmatrix} \quad (23)$$

the following equations hold good:

$$\begin{aligned} t_{11} &= nxEn_{xs} + OXEO_{xs} + aXEa_{xs} \\ t_{12} &= nxEn_{ys} + OXEO_{ys} + aXEa_{ys} \\ t_{13} &= nxEn_{zs} + OXEO_{zs} + aXEa_{zs} \\ t_{21} &= nYEn_{xs} + OYEO_{xs} + aYEa_{xs} \\ t_{22} &= nYEn_{ys} + OYEO_{ys} + aYEa_{ys} \\ t_{23} &= nYEn_{zs} + OYEO_{zs} + aYEa_{zs} \\ t_{31} &= nzEn_{xs} + OzEO_{xs} + azEa_{xs} \\ t_{32} &= nzEn_{ys} + OzEO_{ys} + azEa_{ys} \\ t_{33} &= nzEn_{zs} + OzEO_{zs} + azEa_{zs} \end{aligned} \quad (24)$$

The transformation matrix R obtained through rotation around a unit vector $\vec{K}=(K_x, K_y, K_z)^t$ by an angle $\phi$ can be expressed as follows:

$$R = \begin{bmatrix} k_x k_x v\phi + c\phi & k_y k_x v\phi - k_z s\phi & k_z k_x v\phi + k_y s\phi \\ k_x k_y v\phi + k_z s\phi & k_x k_y v\phi + c\phi & k_z k_y v\phi - k_x s\phi \\ k_x k_z v\phi - k_y s\phi & k_y k_z v\phi + k_x s\phi & k_x k_z v\phi + c\phi \end{bmatrix}$$

where $$v\phi = 1 - \cos\phi, \quad c\phi = \cos\phi, \quad s\phi = \sin\phi \quad (25)$$

Therefore, by setting up the relationship: $R = T$, the equivalent rotation axis vector $\vec{K}$ giving the transformation T and the rotation angle $\phi$ can be obtained. By comparing the elements of the equations (23) and (25) with each other, the following equations can be obtained:

$$\begin{aligned} t_{32} - t_{23} &= 2k_x \sin\phi \\ t_{12} - t_{31} &= 2k_y \sin\phi \\ t_{21} - t_{12} &= 2k_y \sin\phi \end{aligned} \quad (26)$$

$$t_{11} + t_{22} + t_{33} = 1 + 2\cos\phi \quad (27)$$

Thus, supposing $$m^2 = (t_{32} - t_{23})^2 + (t_{13} - t_{31})^2 + (t_{21} - t_{12})^2 \quad (28)$$

the following equation holds good:

$$m^2 = (2 \sin \phi)^2 \quad (29)$$

When m is determined to be in the range: $m \geq 0$, $$m = \sqrt{(t_{32} - t_{23})^2 + (t_{13} - t_{31})^2 + (t_{21} - t_{12})^2} \quad (30)$$

and $$\left.\begin{array}{l} k_x = \dfrac{t_{32} - t_{23}}{m} \\[4pt] k_y = \dfrac{t_{23} - t_{31}}{m} \\[4pt] k_z = \dfrac{t_{22} - t_{12}}{m} \end{array}\right\} \quad (31)$$

Further, by the following equation:

$$\phi = \tan^{-1} \dfrac{m}{t_{11} + t_{22} + t_{33} - 1} \quad (32)$$

the rotation axis vector $\vec{k}$ and the rotation angle $\phi$ can be obtained. Accordingly, the attitude interpolation can be effected by interpolating the rotation angle $\phi$ and rotating the vectors $\vec{f}$ and $\vec{g}$, which give the initial attitude, around the vector $\vec{k}$. Suppose that a coefficient $\lambda$ is used with respect to the rotation angle $\phi$ and that interpolation is effected by varying the $\lambda$ from 0 to 1 to realize interpolation. Here, the following relationship is to be assumed:

$$\overline{\phi} = \lambda \phi$$

The vector $\vec{f}\lambda$ that can be obtained by rotating the vector $\vec{f}_S$ around the vector $\vec{k}$ by the angle $\overline{\phi}$ can be expressed as:

$$\vec{f}\lambda = \cos \overline{\phi} \cdot \vec{f}_S + (1 - \cos \overline{\phi}) <\vec{f}_S, \vec{k}> \vec{k} + \sin \overline{\phi} (\vec{k} \times \vec{f}_S) \quad (33)$$

where $<\vec{f}_S$ and $\vec{k}$ represents the inner production of the vectors $\vec{f}_S$ and $\vec{k}$.

Likewise, the vector $\vec{g}\lambda$ that can be obtained by rotating the vector $\vec{g}_S$ around the vector $\vec{k}$ by the angle $\overline{\phi}$ can be expressed as:

$$\vec{g}\lambda = \cos \overline{\phi} \cdot \vec{g}_S + (1 - \cos \overline{\phi}) <\vec{g}_S, \vec{k}> \vec{k} + \sin \overline{\phi} (\vec{k} \times \vec{g}_S) \quad (34)$$

Here, the vector $\vec{h}\lambda$ which results from the rotation by the angle $\overline{\phi}$ of the vector $\vec{h}_S$ ($= \vec{f}_S \times \vec{g}_S$) around the vector $\vec{k}$ can be obtained in the same manner as the equations (23) and (34). However, since obviously $\vec{h} = \vec{f} \times \vec{g}$, it can be obtained from this relationship as needed.

If, in the equation (30), $m = 0$, the rotation angle $\phi$ is 0° or 180°; when $\phi = 0°$, there is no change in the rotation and attitude. As for the path for attitude rotation between two attitudes, the one with the smaller absolute value of the change of angle is to be selected. If $\phi < 180°$, both the rotating direction and the rotating angle are indeterminate when $\phi = 180°$. This corresponds to an error condition, where no interpolation is effected.

While in the above description the interpolation path is obtained using the vectors $\vec{f}$ and $\vec{g}$ representing attitudes as equivalent vectors, it is also possible to adopt the following method, which is shown in FIG. 3. Here, attention is directed to the direction of the main axis of the hand 2 or of the working tool (not shown in FIG. 1) fitted to the hand 2, determining the path mainly through interpolation of the vector indicating this direction. Suppose the vector giving the above-mentioned main axis direction is $\vec{f}$. Here, the attitude at the initial interpolation end is expressed, as in the above example, by a first base vector $\vec{f}_S$ and a second base vector $\vec{g}_S$, and the attitude at the terminal end is expressed by a first base vector $\vec{f}_E$ and a second base vector $\vec{g}_E$. Supposing that the unit vector which is perpendicular to both the vectors $\vec{f}_S$ and $\vec{f}_E$ is a rotation axis vector $\vec{e}$, the following equation holds good:

$$\vec{e} = \dfrac{\vec{f}_S \times \vec{f}_E}{|\vec{f}_S \times \vec{f}_E|} \quad (35)$$

Further, $$\delta = \tan^{-1} \dfrac{|\vec{f}_S \times \vec{f}_E|}{\vec{f}_S \cdot \vec{f}_E} \quad (36)$$

("." indicates the inner product and | | the norm.) represents the angle of rotation (first angle of rotation) of the vector $\vec{f}$ around the vector $\vec{e}$. As to the second base vector $\vec{g}$, attention is directed to the angle it defines with the rotation axis vector $\vec{e}$, effecting interpolation thereof. This is equivalent to directing attention to the rotation of the vector $\vec{g}$ as seen from the coordinate system fixed with respect to the vector $\vec{f}$.

Supposing that the angle defined by the vectors $\vec{e}$ and $\vec{g}$ is to be expressed as $\epsilon$, the following equations hold good:

$$\epsilon_S = \tan^{-1} \dfrac{|\vec{\lambda}_S \times \vec{e}|}{\vec{g}_S \cdot \vec{e}} \quad (37)$$

$$\epsilon_E = \tan^{-1} \dfrac{|\vec{\lambda}_E \times \vec{e}|}{\vec{g}_E \cdot \vec{e}} \quad (38)$$

Thus, $\epsilon_E - \epsilon_S$ is the angle (the second angle of rotation) by which the vector $\vec{g}$ rotates around the vector $\vec{f}$. Accordingly, by using the interpolation coefficient $\lambda$ as in the above example, attitude interpolation can be effected by obtaining a first interpolation result base vector $\vec{f}\lambda$, which corresponds to the result of the rotation by $\overline{\phi}_1 = \lambda \delta$ of the vector $\vec{f}_S$ around the vector $\vec{e}$, and obtaining a second interpolation result base vector $\vec{g}\lambda$, which corresponds to the result of the rotation by $\overline{\phi}_2 = \lambda(\epsilon_E - \epsilon_S)$ of the vector $\vec{g}_S$ around the vector $\vec{f}\lambda$. Thus, $$\vec{f}\lambda = \cos \overline{\phi}_1 \cdot \vec{f}_S + (1 - \cos \overline{\phi}_1) <\vec{f}_S, \vec{e}> \vec{e} + \sin \overline{\phi}_1 (\vec{e} \times \vec{f}_S) \quad (39)$$

$$\vec{g} \cdot \lambda = \cos \overline{\phi}_2 \cdot \vec{g}_S + (1 - \cos \overline{\phi}_2) <\vec{f}_S, \vec{f}\lambda> \vec{f}\lambda + \sin \overline{\phi}_2 (\vec{f}\lambda \times \vec{f}_S) \quad (40)$$

($\vec{g}\lambda$ can be obtained as the vector resulting from the rotation by $\epsilon_S + (\epsilon_E - \epsilon_S) \lambda$ of the vector $\vec{e}$ around the vector $\vec{f}\lambda$. $\overline{\phi}_1, \overline{\phi}_2$ are the angles interpolating the first and second angles of rotation.) Even in the case where such an attitude interpolation method is adopted $\vec{h}\lambda$ can be obtained from the following relationship:

$$\vec{h}\lambda = \vec{f}\lambda \times \vec{g}\lambda.$$

The above two methods of interpolating attitudes are advantageous in that they remain constant with respect to the attitudes at the initial and terminal interpolation ends irrespective of the manner of expression or the selection of coordinate system for that expression, thus making it possible to enable the robot arm end to move along an interpolation path which is easily predictable for the person performing teaching. As to the selection between these two interpolation methods, it can be decided according to the kind of operation and the type of working tool used. For example, when the working tool at the arm end is the hand 2, the method represented by the equations (23) to (34) can be appropriately adopted, and, when the control in the main axis direction of the tool (defined by the vector $\vec{f}$) of the tool is more important than the control of th angle of rotation around the main axis of the tool (defined by the vector $\vec{g}$), the method represented by the equations (35) to (40) may be appropriate.

Further, since the attitude interpolation when changing the attitude of the hand or the working tool is treated as rotation in a three-dimensional space of vectors of a rectangular coordinate system fixed to the hand or the working tool, an attitude changing path can be obtained which is independent of how the reference coordinate system for attitude expression is set and which can be easily predicted by man.

So far, the methods of attitude expression and interpolation for the hand 2 of the robot 1 have been discussed. Next, the processes for actually performing interpolation on the robot 1 will be discussed.

FIG. 4 is a schematic block diagram showing an example of the configuration of a control apparatus for the robot 1. The apparatus shown includes a central processing unit 30 which typically consists of a microcomputer and which is connected to a bus 34. The robot 1 is connected to the above mentioned bus 34 through a servo control section 31. Further, a teaching operation unit 32 and a memory 33 are connected to the bus 34. In operation, the teaching operation unit 32 is manipulated to drive the robot 1 and perform movement teaching. The teaching data to be input at the teaching operation unit 32, i.e., the position/attitude data giving the path of movement for the robot 1, is stored in the memory 33. When making a play-back movement, preparatory calculation processings for interpolation such as those represented by the above equations (23) to (32) or (35) to (38) are performed. Further, on the basis of the results of the above calculation processings, interpolation executing calculations are performed through which the respective positions and attitudes at various times during the interpolation are obtained. On the basis of the results of these calculation processings, so-called inverse coordinate transformation, an example of which is given in the equation (9), is performed, the respective displacements of the robot 1 at different degrees of freedom being supplied as movement objective value commands from the central processing unit 30 through the servo control section 31 to the respective servo systems for the respective axes.

Figure 5:
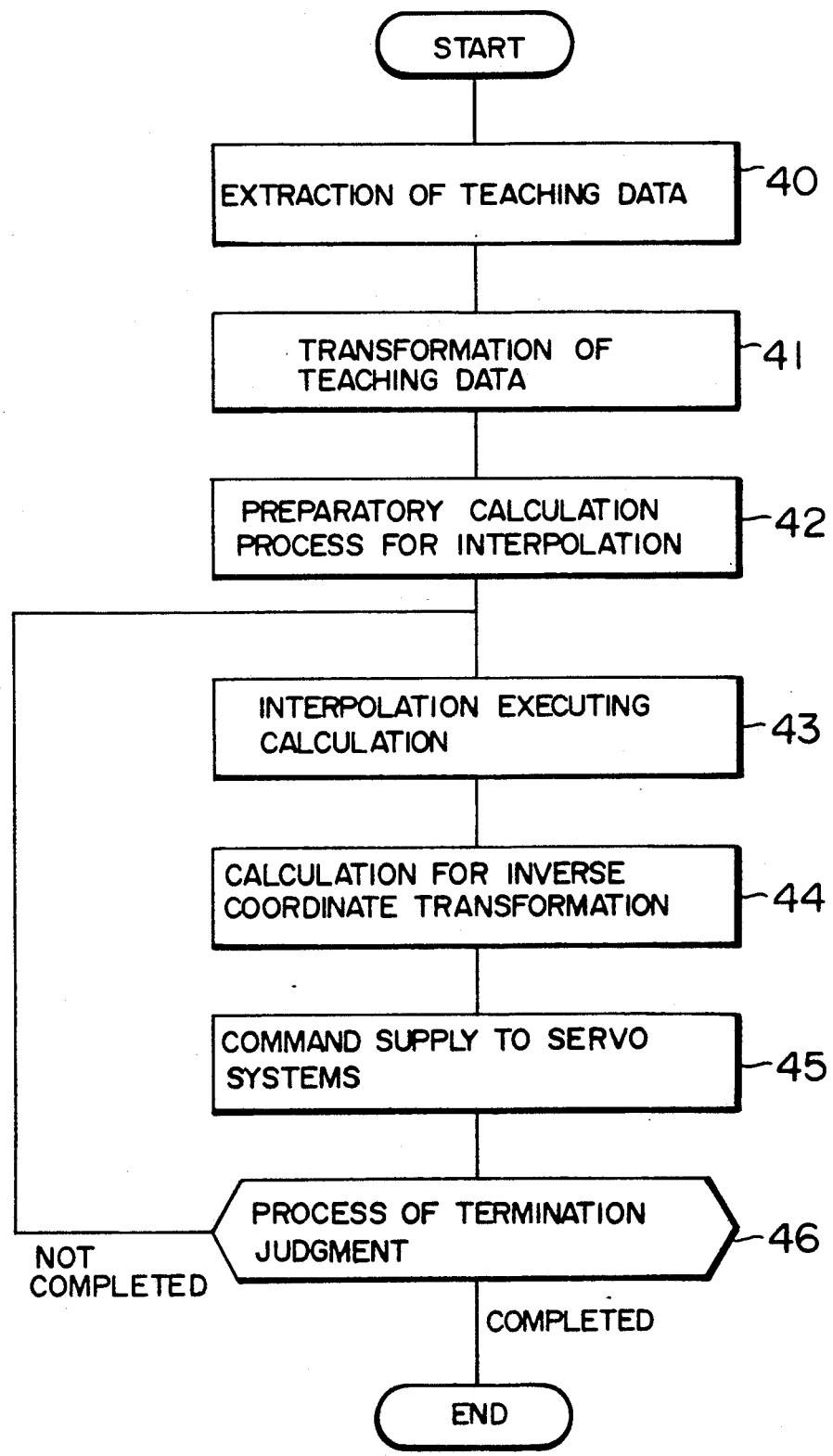
FIG. 5 is a flowchart of a control program for performing attitude interpolation in accordance with this invention.

The flow of processes when making a play-back movement, which is shown in FIG. 5, is performed in the following sequence: extraction of teaching data from memory 33 (process 40); transformation of the teaching data for preparatory calculations for interpolation (process 41); preparatory calculation process for interpolation (process 42); interpolation executing calculations (process 43); calculations for inverse coordinate transformation (process 44); and command supply to servo systems (process 45). In the process of termination judgment (process 46), a judgment is made as to whether the interpolation has been terminated. If it has not been terminated yet, the processes from the interpolation executing calculations (process 43) onwards are repeated. Of these, the processes 43, 44, 45 and 46 are always executed real time while the robot 1 is performing interpolation movements. The processes 40, 41 and 42 are likewise executed in the first interpolation section during operation of the robot 1.

When adopting either of the two interpolation methods shown in the embodiment of this invention, the time required for the processes 41 and 44 depends on the method of expressing positions and attitudes of the robot 1 and can be reduced by selecting the proper expression method. Of these, the calculation processings for the process 44 can be reduced by expressing attitudes by vectors $\vec{f}$, $\vec{g}$, etc., as described above, instead of using angle coordinated values. As for the process 41, its calculation processings can be reduced by arranging the storage system for the teaching data in such a manner as to be suited for the process 42. It is to be noted in this regard that the process 42 corresponds to the equations (23) to (32) or (35) to (38). Thus, the employment of vector forms such as $\vec{f}$ and $\vec{g}$ is obviously advantageous than the employment of angle coordinate values. In the case where Euler's angles are used as the angle coordinate values, it is necessary to use the equations (10) to (15), etc., for the transformation involved.

Figure 6:
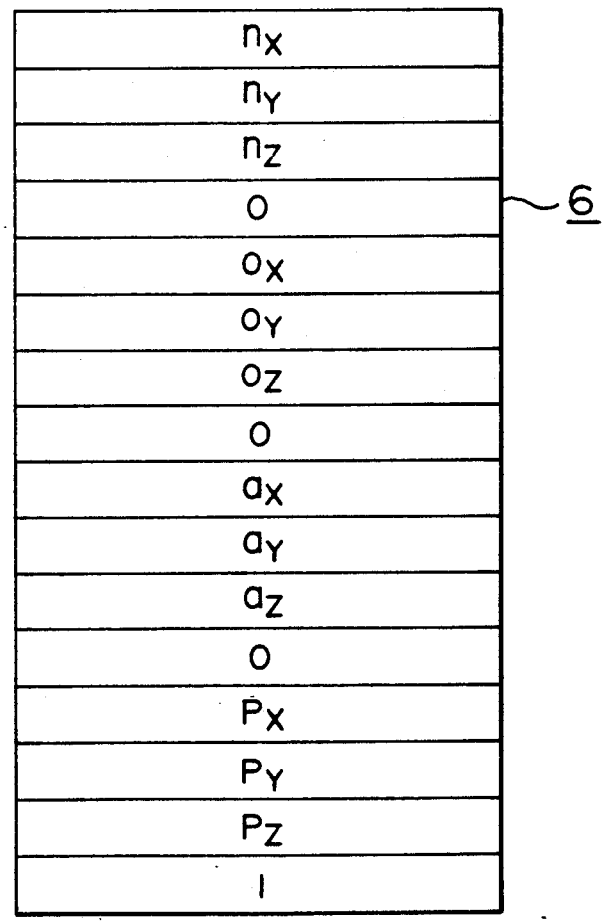
FIG. 6 shows an example of the teaching-data storage system in accordance with this invention.
Figure 7:
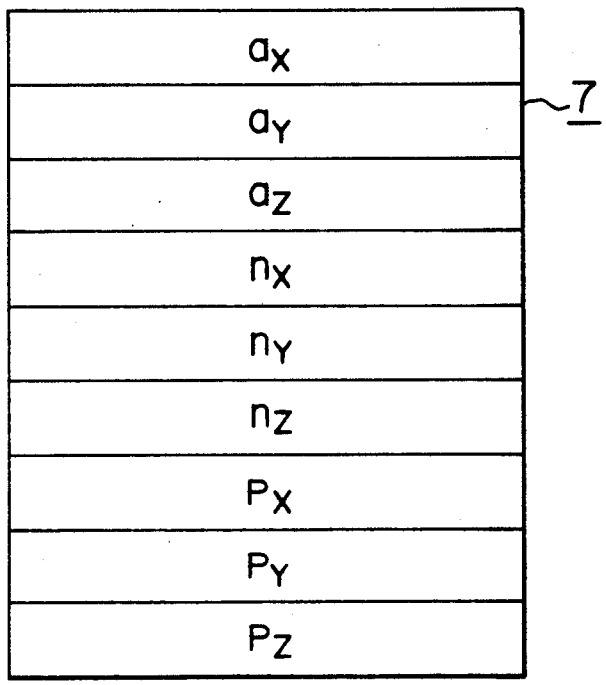
FIG. 7 shows another example of the teaching-data storage system.
Figure 8:
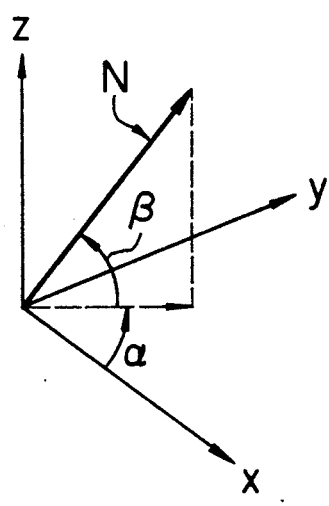
FIG. 8 illustrate an example of the conventional methods of representing angle coordinates.

Thus, from all points of view, it is more advantageous to employ vectors such as $\vec{f}$ and $\vec{g}$ as the form of storage for the teaching data. FIGS. 6 and 7 show examples of the storage system. In the example shown in Table 6 of FIG. 6, the entire elements of the matrix of 4 rows and 4 columns, shown in the equation (1), are stored, whereas, in the example shown in Table 7 of FIG. 7, the matrix elements are stored with those of the 4th row and the 2nd column being removed. Both these tables represent teaching data corresponding to a single teaching point, i.e., a single position and a single attitude of the robot hand 2. In the case of a microcomputer, the respective data elements are generally stored in the form of floating-points of 32 bits or so. The example shown in FIG. 7 is sufficiently practical since the elements in the 4th row of the matrix (1) are always (0, 0, 0, 1) and the elements in the 2nd column $\vec{h} = (ox, oy, oz)^t$ can be easily calculated from the equation (16). Apart from these methods, it is also possible to remove those elements from the matrix of the equation (1) of 4 rows and 4 columns which can be easily restored, storing the rest of the elements. For example, only those elements of the first to the third columns which are in the third row may be removed. Alternatively, only the elements in the first column plus those in the fourth row may be removed. The example shown in FIG. 7 requires the storage of 9 parameters while the method according to which the position and attitude of the hand 2 of the robot 1 are stored with 6 parameters (3 parameters of position coordinate values and 3 parameters of angle coordinate values); the method using displacements $(\theta_1, \theta_2, \ldots \theta_6)$ at different degrees of freedom also requires only 6 parameters. However, the requisite storage amount for the example shown in FIG. 7 is about 60% of that of the example shown in FIG. 6, where 16 parameters are stored.

The real-time computing speed during operation of the robot 1 directly influences the output time intervals of the command positions for the respective degrees of freedom with respect to the servo control section 31. The shorter the output time intervals, the more improved the path accuracy of the robot 1. Accordingly, taking into account the relationship between memory capacity and computing speed, the storage system shown in FIG. 7, which makes it possible to substantially reduce the calculating processings, is more effective as the memory, in view of the fact that inexpensive IC memories with large capacity are available nowadays. If, in the future, IC memories, etc. come to be equipped with still larger capacity, the memory system shown in FIG. 6, which stores 16 parameters, will also be effective.

Thus, in accordance with this invention, attitude data on a robot hand or a working tool is stored in the form of vector components, so that the calculation processings for real-time inverse coordinate transformation, through which displacements at the respective degrees of freedom of the robot are obtained from the attitude data during robot movement control operation, can be reduced, resulting in reduced time intervals for the commands output to the servo systems of the respective degrees of freedom of the robot, thereby making it possible to realize a highly accurate robot movement which is smoother in respect of both time and space.

Furthermore, with a movement control method using the attitude interpolation method of this invention, attitude changing interpolation is effected through the rotation of base vectors of a rectangular coordinate system fixed to the hand or the working tool, so that an interpolation path which is more in harmony with the feeling of the operator can be generated, thus avoiding the danger of the hand or the working tool making an unexpected movement and realizing a highly safe robot movement which helps to maintain a high operation quality.

What is claimed is:

1. A method of controlling the motion of a robot possessing a plurality of degrees of freedom, said method comprising the steps of:

storing pose data signals defined as sets of position and orientation values of a hand or a tool fitted to an arm end of the robot, wherein said orientation values represent first and second base vectors of three base vectors of a rectangular coordinate system fixed to said hand or said tool, said base vectors being expressed as coordinate components of a reference rectangular coordinate system;

reading orientation values at initial and terminal interpolation points;

obtaining at least an axis of rotation and an angle of rotation based on said orientation values at said initial and terminal interpolation points;

determining a post interpolation path signal based on said axis of rotation, said angle of rotation and said orientation values at initial and terminal interpolation points; and controlling the movement of said hand or tool of said robot on the basis of said pose interpolation path signal.

2. A method of controlling robot motion, wherein at least two sets of orientation value signals of a hand or a tool fitted to an arm end of a robot possessing a plurality of degrees of freedom are stored in memory, and wherein by effecting interpolation between the sets of orientation value signals robot motion is controlled, said method comprising the steps of:

expressing orientations of said hand or said tool as orientation value signals representing first and second base vectors of three base vectors of a rectangular coordinate system fixed to said hand or said tool of said robot, said orientations being expressed as coordinate components of a reference rectangular coordinate system;

computing a third base vector as a product of said first and second base vectors to obtain said three base vectors of said rectangular coordinate system fixed to said hand or said tool;

obtaining mutual transformation as a homogeneous transformation from said first, second and third base vectors at initial and terminal interpolation points of the rectangular coordinate system fixed to said hand or said tool.

obtaining an axis of rotation and an angle of rotation to compute rotational transformation around a single axis which is equivalent to said homogeneous transformation;

obtaining resultant base vectors by rotating said first, second and third base vectors around said axis of rotation while interpolating said angle of rotation;

determining an orientation interpolation path signal for said hand or said tool of said robot by use of said resultant base vectors obtained; and effecting controlled movement of said hand or said tool of said robot based on said orientation interpolation path signal.

3. A method of controlling robot motion wherein at least two sets of orientation value signals of a hand or a tool fitted to an arm end of a robot possessing a plurality of degrees of freedom are stored in memory, and wherein by effecting interpolation between said orientation value signals, robot motion is controlled, said method comprising the steps of:

expressing orientations of said hand or said tool of said robot as orientation value signals representing first and second base vectors of three base vectors of a rectangular coordinate system fixed to said hand or said tool of said robot, said orientations are expressed as coordinate components of a reference rectangular coordinate system;

obtaining an axis of rotation vector which is commonly perpendicular to said first base vector at initial and terminal interpolation points;

obtaining a first angle of rotation which is defined as an angle between said first base vector at said initial and terminal interpolation points;

computing a twisting angle defined by said second base vector and said axis of rotation vector signal;

obtaining a second angle of rotation signal defined as a difference between said twisting angle at initial and terminal interpolation points;

obtaining first and second interpolation angles by interpolating said first and second angles of rotation;

obtaining a first resultant base vector by rotating said first base vector around said axis of rotation vector signal by the amount of said first interpolation angle;

obtaining a second resultant base vector by rotating said second base vector around said first resultant base vector by the amount of said second interpolation angle;

determining an orientation interpolation path signal for said hand or said tool of said robot by said first and second resultant base vectors; and effecting controlled movement of said hand or said tool of said robot based on said orientation interpolation path signal.

* * * * *